United States Patent
Wu et al.

(10) Patent No.: US 11,368,527 B2
(45) Date of Patent: Jun. 21, 2022

(54) DECENTRALIZED NODE FINDER IN MULTI-CLOUD COMPUTING ENVIRONMENT

(71) Applicant: EMC IP Holding Company LLC, Hopkinton, MA (US)

(72) Inventors: Pengfei Wu, Shanghai (CN); Zhi Ying, Shanghai (CN); Kun Wang, Beijing (CN)

(73) Assignee: EMC IP Holding Company LLC, Hopkinton, MA (US)

(*) Notice: Subject to any disclaimer, the term of this patent is extended or adjusted under 35 U.S.C. 154(b) by 398 days.

(21) Appl. No.: 16/180,234

(22) Filed: Nov. 5, 2018

(65) Prior Publication Data

US 2020/0137154 A1   Apr. 30, 2020

(30) Foreign Application Priority Data

Oct. 30, 2018   (CN) .......................... 201811277861.9

(51) Int. Cl.
*H04L 29/08* (2006.01)
*H04L 9/06* (2006.01)
(Continued)

(52) U.S. Cl.
CPC ...... *H04L 67/1065* (2013.01); *G06F 16/1834* (2019.01); *G06F 16/27* (2019.01); *H04L 9/0643* (2013.01); *H04L 2209/38* (2013.01)

(58) Field of Classification Search
CPC ............. H04L 67/1097; H04L 67/1065; H04L 9/0643; H04L 9/3239; H04L 67/10;
(Continued)

(56) References Cited

U.S. PATENT DOCUMENTS 8,352,429 B1 * 1/2013 Mamidi .............. G06F 16/2282
707/642
9,489,652 B1 * 11/2016 Hillyard .............. G06Q 10/087
(Continued)

OTHER PUBLICATIONS

U.S. Appl. No. 15/959,386 filed in the name of Pengfei Wu et al. on Apr. 23, 2018 and entitled "Decentralized Data Protection System for Multi-Cloud Computing Environment.".
(Continued)

*Primary Examiner* — Kamal B Divecha
*Assistant Examiner* — Clifton Houston
(74) *Attorney, Agent, or Firm* — Ryan, Mason & Lewis, LLP

(57) ABSTRACT

In a multi-cloud computing environment comprising a plurality of cloud platforms with each cloud platform comprising one or more nodes, a method maintains at a given one of the nodes in the multi-cloud computing environment a blockchain instance in accordance with a decentralized blockchain network comprised of at least a subset of the nodes in the multi-cloud computing environment wherein each of the subset of nodes locally maintain a blockchain instance. Further, the method maintains at the given one of the nodes a global state database which is locally synchronized with the locally maintained blockchain instance and stores identifying information about nodes in the multi-cloud computing environment, wherein the identifying information comprises information on how to find one or more of the nodes.

20 Claims, 7 Drawing Sheets

700

```
GLOBAL STATE:
AZURE: [10.0.1.6, 10.0.1.7, 104.42.75.64, 34.195.205.109]
AWS: [...]
GPU: [10.0.1.6]
712 → FPGA: [104.42.75.64, 34.195.205.109]
10.0.1.6: {...}
10.0.1.7: {...}
104.42.75.64: {...}
34.195.205.109: {...}
```

714 → ▭-▭-▭-▭

716 → DECENTRALIZED BLOCKCHAIN NETWORK

(51) Int. Cl.
*H04L 67/1061* (2022.01)
*G06F 16/27* (2019.01)
*G06F 16/182* (2019.01)

(58) Field of Classification Search
CPC . H04L 67/1095; G06F 16/27; G06F 16/1834; G06F 16/273
See application file for complete search history.

(56) References Cited

U.S. PATENT DOCUMENTS

| | | | | |
|---|---|---|---|---|
| 10,574,591 | B1* | 2/2020 | Houston | H04L 67/1002 |
| 10,735,193 | B1* | 8/2020 | Knas | H04L 63/0428 |
| 2013/0094636 | A1* | 4/2013 | Bowerman | H04M 11/00 |
| | | | | 379/88.13 |
| 2014/0056193 | A1* | 2/2014 | Huang | H04W 4/70 |
| | | | | 370/328 |
| 2014/0297653 | A1* | 10/2014 | Liu | G06F 16/245 |
| | | | | 707/747 |
| 2016/0028831 | A1* | 1/2016 | Rantapuska | H04W 8/005 |
| | | | | 709/228 |
| 2016/0381149 | A1* | 12/2016 | Bjornson | H04L 67/16 |
| | | | | 709/217 |
| 2019/0044703 | A1* | 2/2019 | Smith | G06V 10/82 |
| 2019/0044741 | A1* | 2/2019 | Middleton | H04L 9/0637 |
| 2019/0102761 | A1* | 4/2019 | Pandian | G06Q 20/108 |
| 2019/0182257 | A1* | 6/2019 | Lee | H04L 9/3239 |
| 2019/0303882 | A1* | 10/2019 | Purushothaman | G06Q 10/087 |
| 2019/0312863 | A1* | 10/2019 | Chow | H04L 9/3247 |
| 2019/0312877 | A1* | 10/2019 | Zhang | G06F 21/30 |
| 2019/0332702 | A1* | 10/2019 | Manamohan | G07C 13/00 |
| 2019/0334726 | A1* | 10/2019 | Kelly | H04L 9/3239 |
| 2019/0349190 | A1* | 11/2019 | Smith | H04L 9/3239 |
| 2019/0372834 | A1* | 12/2019 | Patil | H04L 9/3297 |
| 2019/0372985 | A1* | 12/2019 | Zamora Duran | H04L 63/123 |
| 2020/0019616 | A1* | 1/2020 | Sukhija | G06F 16/20 |
| 2020/0076571 | A1* | 3/2020 | Natarajan | G06F 16/2379 |
| 2020/0125738 | A1* | 4/2020 | Mahatwo | G06F 21/602 |
| 2020/0202350 | A1* | 6/2020 | Chan | G06F 16/2365 |
| 2020/0389294 | A1* | 12/2020 | Soundararajan | H04L 9/06 |

OTHER PUBLICATIONS

Satoshi Nakamoto, "Bitcoin: A Peer-to-Peer Electronic Cash System," http://bitcoin.org/bitcoin.pdf, 2008, 9 pages.

* cited by examiner

712 →  GLOBAL STATE:
AZURE: [10.0.1.6, 10.0.1.7, 104.42.75.64, 34.195.205.109]
AWS: [...]
GPU: [10.0.1.6]
FPGA: [104.42.75.64, 34.195.205.109]
10.0.1.6: {...}
10.0.1.7: {...}
104.42.75.64: {...}
34.195.205.109: {...}

714 →  ☐→☐→☐→☐

716 →  DECENTRALIZED BLOCKCHAIN NETWORK

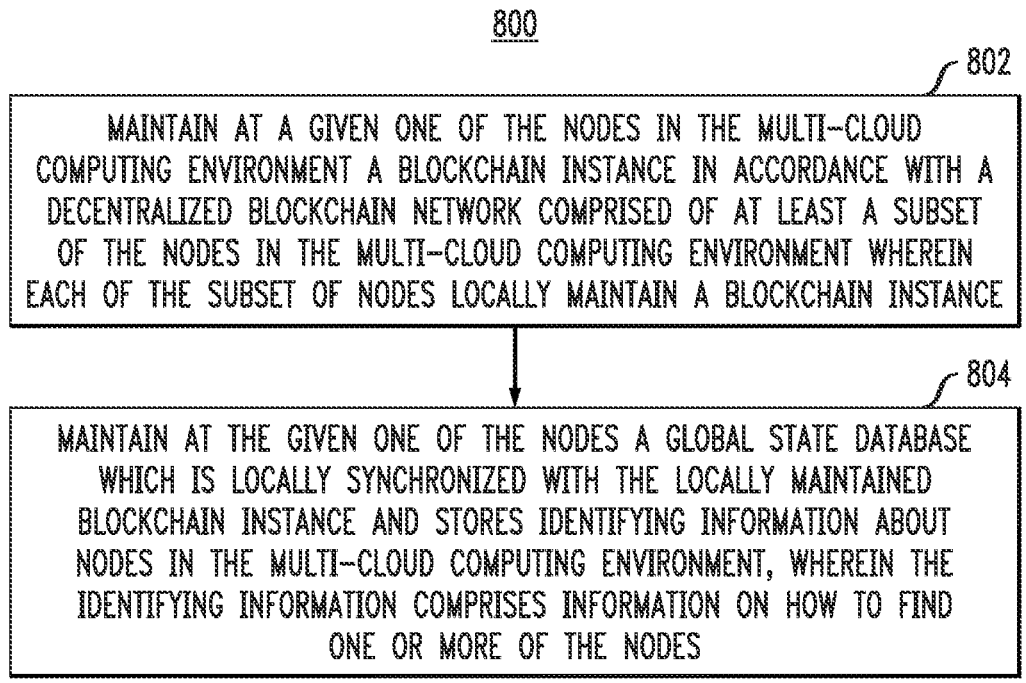
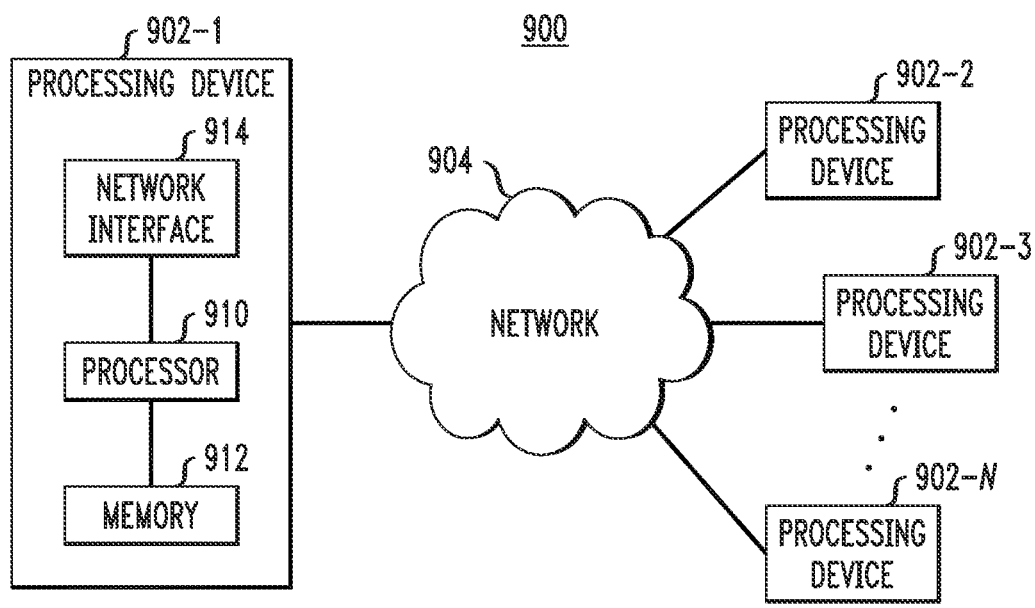

DECENTRALIZED NODE FINDER IN MULTI-CLOUD COMPUTING ENVIRONMENT

FIELD

The field relates generally to data management and, more particularly, to finding nodes in a multi-cloud computing environment used for data management.

BACKGROUND

Enterprises such as corporations typically utilize a cloud computing environment to manage their data. One or more cloud platforms that are part of this environment may be within the exclusive control and management of the enterprise, and therefore are considered "private clouds." On the other hand, the cloud computing environment can include one or more cloud platforms that can be used by multiple enterprises, and not necessarily controlled or managed by any of the multiple enterprises but rather are controlled and managed by one or more third-party cloud providers. Such cloud platforms are typically considered "public clouds." More typically, enterprises may choose to host their data (as well as applications, workloads, services, etc.) on a combination of private and public clouds. A multiple cloud configuration is referred to as a multi-cloud computing environment. One or more clouds may also be referred to as a "data center." Alternatively, a data center may be comprised of one or more clouds.

The emergence of multi-cloud computing environments increases the need for data management (e.g., data storage and/or data protection) across multiple clouds. However, attempts to provide data management across multiple clouds using existing solutions present significant challenges for an enterprise.

SUMMARY

Embodiments of the invention provide data management techniques in a multi-cloud computing environment comprising a decentralized node finder system and methodology.

For example, in one embodiment, a method comprises the following steps. In a multi-cloud computing environment comprising a plurality of cloud platforms with each cloud platform comprising one or more nodes, the method maintains, at a given one of the nodes in the multi-cloud computing environment, a blockchain instance in accordance with a decentralized blockchain network comprised of at least a subset of the nodes in the multi-cloud computing environment wherein each of the subset of nodes locally maintain a blockchain instance. Further, the method maintains, at the given one of the nodes, a global state database which is locally synchronized with the locally maintained blockchain instance and stores identifying information about nodes in the multi-cloud computing environment, wherein the identifying information comprises information on how to find one or more of the nodes.

Advantageously, illustrative embodiments utilize decentralized blockchain network techniques in a multi-cloud computing environment to overcome drawbacks associated with existing data management approaches. For example, one or more illustrative embodiments provide a decentralized system where each node has a local blockchain instance and a global state database synchronized with the local blockchain instance that enables each node to locally query its own database to find one or more other nodes in the network.

These and other features and advantages of the invention will become more readily apparent from the accompanying drawings and the following detailed description.

BRIEF DESCRIPTION OF THE DRAWINGS

FIG. 7 illustrates an example of a global state for finding one or more nodes according to an illustrative embodiment.

FIG. 8 illustrates a decentralized methodology for finding one or more nodes in a multi-cloud computing environment according to an illustrative embodiment.

FIG. 9 illustrates a processing platform used to implement a decentralized node finder system and methodology according to an illustrative embodiment.

DETAILED DESCRIPTION

Figure 1:
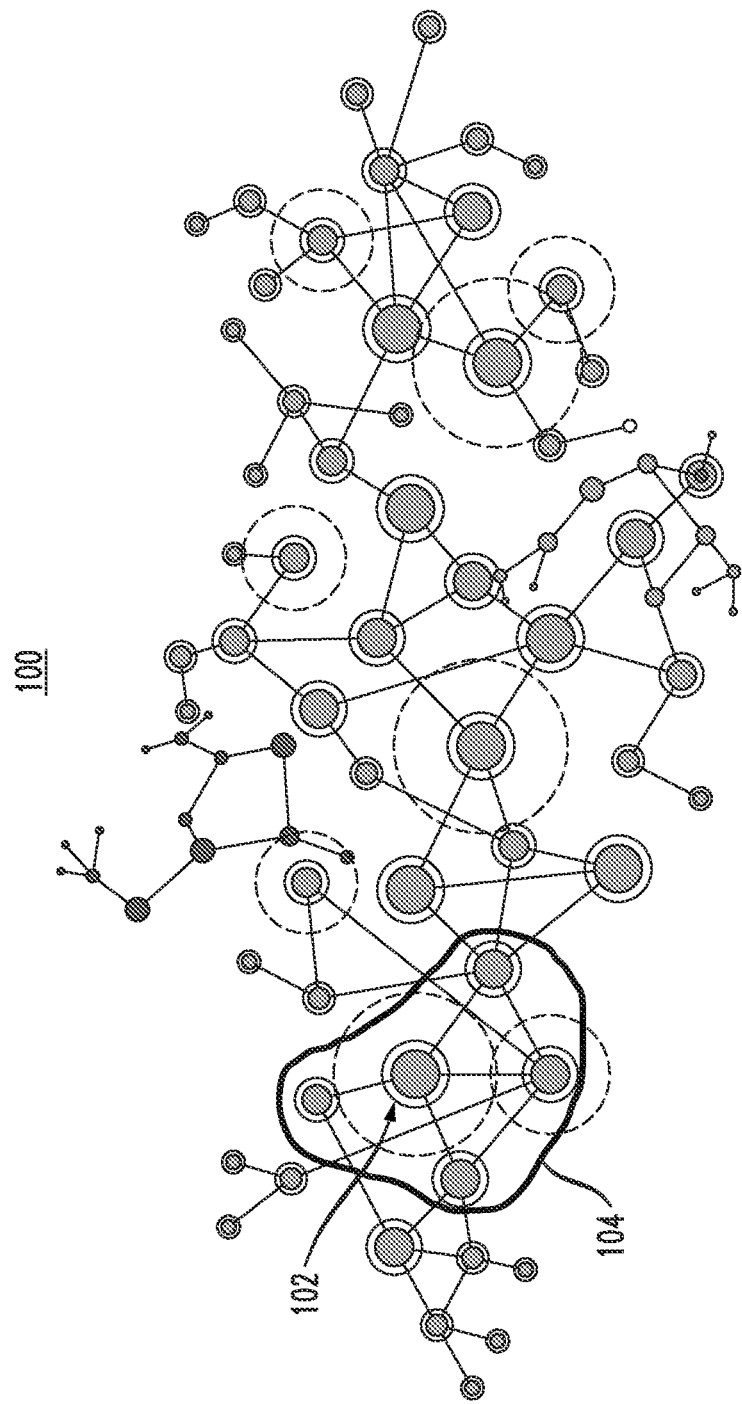
FIG. 1 illustrates a decentralized network of nodes in a multi-cloud computing environment with which one or more illustrative embodiments are implemented.

Illustrative embodiments will be described herein with reference to exemplary information processing systems and associated host devices, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual computing resources. An information processing system may therefore comprise, for example, a cloud infrastructure hosting multiple tenants that share cloud computing resources. Such systems are considered examples of what are more generally referred to herein as cloud computing environments. Environments that implement multiple cloud platforms are referred to as multi-cloud computing environments. As mentioned above, a multi-cloud computing environment employed by an enterprise may comprise two or more clouds (e.g., two or more private clouds, two or more public clouds, or a combination of one or more private clouds and one or more public clouds). The term "enterprise" as used herein is intended to be broadly construed, and may comprise, for example, one or more businesses, one or more corporations or any other one or more entities, groups, or organizations. An "entity" as illustratively used herein may be a person or system.

Illustrative embodiments provide a decentralized node finder system and methodology in a multi-cloud computing environment. The multi-cloud computing environment may include a wide variety of computing resources that form an information processing system. The term "computing resource," as illustratively used herein, can refer to any computing or processing device, endpoint, component, element, platform, cloud, data center, storage array, client, server, gateway, or other resource, that is part of a multi-cloud computing environment associated with an enterprise. For example, one or more such computing resources are generally referred to herein as a "node."

To avoid vendor lock-in, it is desirable to use a multi-cloud strategy comprising two or more cloud computing services. A decentralized solution is preferred in such a strategy in order to avoid deploying a centralized server on any specific public cloud. In such a multi-cloud computing environment, a decision has to be made on which cloud (along with other specific requirements) should the service be deployed on. In this decision process, the following problem arises: how to find a specific node in a multi-cloud computing environment without a centralized server and without broadcasting to the entire network.

One proposed solution is based on distributed hash tables (DHT). DHT is a class of decentralized systems that provides a lookup service similar to a hash table where (key, value) pairs are stored in a DHT and participating nodes retrieve the value associated with a given key. However, a DHT based solution has several limitations including, but not limited to, a lack of authentication, data is not traceable, expiration of DHT records, and it is not robust to network partition and not efficient in finding nodes.

Illustrative embodiments propose a decentralized node finding system based on blockchain, which can solve the above-mentioned DHT problems and can be part of any decentralized multi-cloud system. By way of one non-limiting example, a decentralized node finding system as proposed herein may be implemented in a decentralized data protection system in a multi-cloud computing environment. However, it is to be appreciated that the decentralized node finding system described herein can be used in multi-cloud data management use cases other than data protection.

FIG. 1 illustrates a decentralized network 100 of nodes in a multi-cloud computing environment with which one or more illustrative embodiments are implemented. More particularly, FIG. 1 highlights a key problem in a decentralized system. In a peer-to-peer (p2p) network without any centralized server, such as denoted by the various sized interconnected circles (represented computing nodes or simply "nodes"), existing solutions do not enable a given node to find other nodes with specific properties that may happen to be outside of its directly connected scope without broadcasting to the entire network. For example, assume node 102 typically operates within a set of other nodes defined by boundary 104 (e.g., this could be a cloud platform boundary, a geographic boundary, an enterprise boundary, a functional boundary, etc.). Thus, the problem is how does node 102 find nodes with specific properties outside of boundary 106 without broadcasting to the entire network 100.

Figure 2:
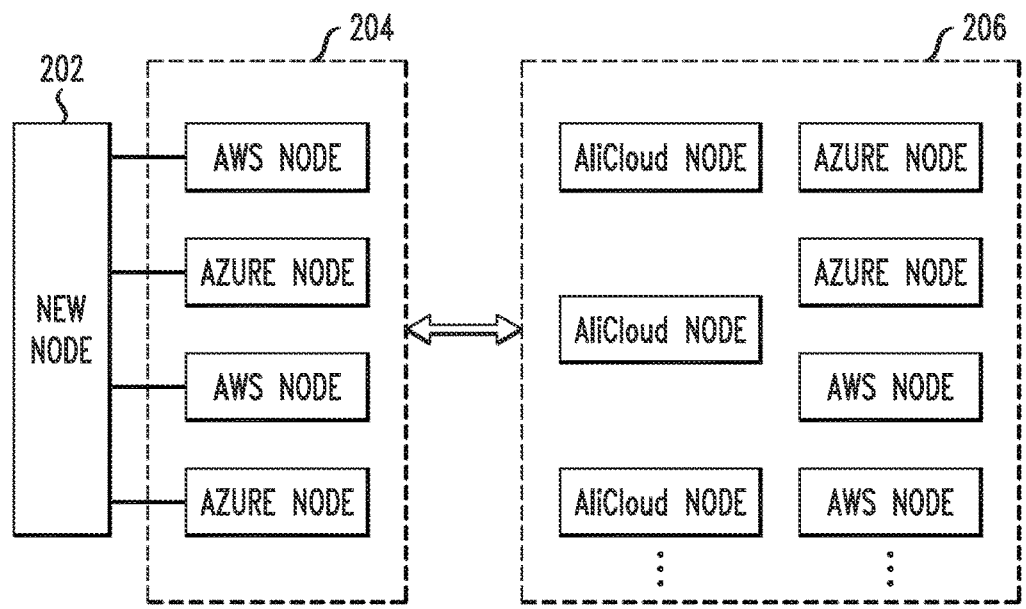
FIG. 2 illustrates a new node associated with a set of cloud nodes joining the decentralized network of FIG. 1 seeking another node associated with one or more other sets of cloud nodes in the decentralized network.

More specifically, assuming a network of decentralized nodes such as network 100 depicted in FIG. 1, FIG. 2 illustrates an example 200 with a new node 202 associated with one or more sets of cloud nodes 204 joining the decentralized network seeking another node in the decentralized network associated with one or more other sets of cloud nodes 206. In this non-limiting example, the one or more sets of cloud nodes 204 comprise a plurality of Amazon Web Service (AWS) nodes and a plurality of Microsoft Azure cloud nodes, while the one or more other sets of cloud nodes 206 comprise a plurality of Alibaba nodes (AliCloud nodes) and a plurality of AWS nodes. In such a p2p setting, the issue is how can new node 202 which is directly connected to AWS nodes and Azure nodes (in 204) find any AliCloud nodes (in 206) without broadcasting to the entire decentralized network. In one example, the nodes in set 204 can be nodes storing original data, while nodes in set 206 store copies of the original data for data protection (backup or replication) purposes.

Despite the complexity, the multi-cloud computing environment in FIG. 2 has several potential use cases. For example, one use case is data protection load balancing across multiple server nodes on one or more cloud platforms. Assuming a new node is joining existing data protection nodes, the new node registers itself with the corresponding cloud platform by indicating storage capacity, region, input/output (I/O) throughput, and updates its status dynamically. In another example, assume an orchestration layer has to traverse/query all nodes to calculate the node with the best cost balance or with the best performance, when any backup policy/activities are running, to find out near and available capacity from a cloud platform. Another use case involves the node establishing direct connections with other nodes to form a subnet and create an efficient way of sharing resources. Still further, in a data protection auto-upgrade on a cloud platform, an orchestration layer calculates the priority of server nodes with different versions based on location as well as cloud regions for a best approach when auto-upgrade is triggered for thousands of nodes running on cloud platforms.

As mentioned above, it has been proposed that the problem of decentralized node finding in the above and other use cases can be solved by broadcasting or by using DHT. These approaches have the following problems. Note that many of these problems are common to nodes that run within the context of one cloud as well as across multiple clouds.

Poor Performance in Terms of Broadcasting.

The basic way of finding a specific node in a decentralized p2p network is by broadcasting. However, broadcasting results in a large amount of network traffic being generated, which causes congestion in the network. Moreover, broadcasting to find a single node is inefficient and the result is not guaranteed.

Lack of Authentication.

When DHT is used, the node-finding message sent out by the new node is not solely relied upon by other nodes, so DHT-based method has a much better performance compared with the broadcasting-based method. However, the DHT method lacks authentication features. Any nodes (including those not controlled by a system administrator) can publish node descriptions to the DHT, making the system vulnerable to a sybil attack. This could be a critical issue in both private and public networks.

Data not Traceable.

When DHT is used, any changes in the DHT are not traceable, which exposes a problem similar to the authentication problem mentioned above. In a private network, the system administrator may need the data changes log for performance maintenance to identity potential issues. While in a public network, the data traces are required to identify malicious nodes.

Expiration of DHT Record.

A DHT record will expire after a fixed time (the typical value is 8 hours). It is important for a node to republish its description to the DHT periodically so that other nodes can find it via DHT. However, at least one problem surfaces. In a decentralized network, nodes are expected to join and leave the network constantly. Once a node fails and the DHT record expires, there is no way for the other nodes of the network to find the node any more.

Not Robust to Network Partition.

DHT does not guarantee that a given node will be found once it has been registered (by creating a record in DHT). When network partition occurs, certain nodes may not be found.

Inefficient search. DHT based node registration relies on a cryptographic hash, which means if a node wants to find a specific node, the search description should be exactly the same as the node's registration description. However, in a working environment, a node may have a number of properties registered, while only a subset of the properties is required by the node finder. In this case, the node finding procedure is inefficient, since a large number of search descriptions are created to cover all possible nodes to be found.

Illustrative embodiments overcome the above and other drawbacks with existing node finding systems by providing a decentralized node finder system and methodology based on blockchain.

As used herein, the terms "blockchain," "digital ledger" and "blockchain digital ledger" may be used interchangeably. A blockchain or digital ledger protocol is implemented via a distributed, decentralized computer network of compute nodes (computing resources or nodes). The compute nodes are operatively coupled in a peer-to-peer communications protocol. In the computer network, each compute node is configured to maintain a blockchain which is a cryptographically secured record or ledger of data blocks that represent respective transactions within a given computational environment. The blockchain is secured through use of a cryptographic hash function. A cryptographic hash function is a cryptographic function which takes an input (or "message") and returns a fixed-size alphanumeric string, which is called the hash value (also a message digest, a digital fingerprint, a digest, or a checksum). Each blockchain is thus a growing list of data records hardened against tampering and revision, and typically includes a timestamp, current transaction data, and information linking it to a previous block. More particularly, each subsequent block in the blockchain is a data block that includes a given transaction(s) and a hash value of the previous block in the chain, i.e., the previous transaction. That is, each block is typically a group of transactions. Thus, advantageously, each data block in the blockchain represents a given set of transaction data plus a set of all previous transaction data. In existing digital ledger technologies such as blockchain, an underlying consensus algorithm is typically used to validate new transactions before they are added to the digital ledger. Typically, for example, the new transaction entry is broadcast to all nodes within the network and inspected, a consensus is reached, and the entry is formally committed to the blockchain when consensus is reached that the entry is valid.

In the case of a "bitcoin" type implementation of a blockchain distributed ledger, the blockchain contains a record of all previous transactions that have occurred in the bitcoin network. The bitcoin system was first described in S. Nakamoto, "Bitcoin: A Peer to Peer Electronic Cash System," 2008, the disclosure of which is incorporated by reference herein in its entirety.

A key principle of the blockchain is that it is trusted. That is, it is critical to know that data in the blockchain has not been tampered with by any of the compute nodes in the computer network (or any other node or party). For this reason, a cryptographic hash function is used. While such a hash function is relatively easy to compute for a large data set, each resulting hash value is unique such that if one item of data in the blockchain is altered, the hash value changes. However, it is realized that given the constant generation of new transactions and the need for large scale computation of hash values to add the new transactions to the blockchain, the blockchain protocol rewards compute nodes that provide the computational service of calculating a new hash value. In the case of a bitcoin network, a predetermined number of bitcoins are awarded for a predetermined amount of computation. The compute nodes thus compete for bitcoins by performing computations to generate a hash value that satisfies the blockchain protocol. Such compute nodes are referred to as "miners." Performance of the computation of a hash value that satisfies the blockchain protocol is called "proof of work." While bitcoins are one type of reward, blockchain protocols can award other measures of value (monetary or otherwise) to successful miners. It is to be appreciated that the above description represents an illustrative implementation of the blockchain protocol and that embodiments are not limited to the above or any particular blockchain protocol implementation. As such, other appropriate processes may be used to securely maintain and add to a set of data in accordance with embodiments of the invention. For example, distributed ledgers such as, but not limited to, R3 Corda, Ethereum, and Hyperledger may be employed in alternative embodiments.

Figure 3:
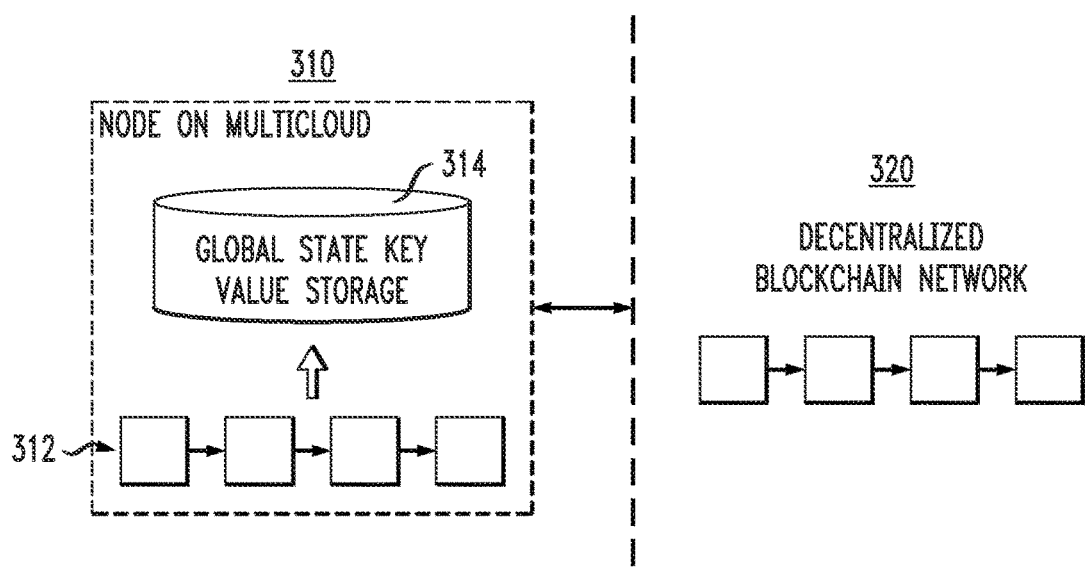
FIG. 3 illustrates a decentralized node finder system and methodology in a multi-cloud computing environment according to an illustrative embodiment.

FIG. 3 illustrates a decentralized node finder system and methodology in a multi-cloud computing environment according to an illustrative embodiment. More particularly, FIG. 3 illustrates an architecture 300 for providing a blockchain-based node finder system and methodology according to an illustrative embodiment. As will be further explained, a blockchain is used to store node registration information in a decentralized manner.

As shown, each node 310 runs a blockchain client 312 which is part of a decentralized blockchain network 320, meaning that the local blockchain instance stored by the blockchain client 312 will reflect the same blockchain distributed at each other node in the decentralized blockchain network 320. A global state is derived from the blockchain and stored locally in a key-value database, i.e., global state key value storage 314. In one or more embodiments, the database in storage 314 only reflects the changes on the blockchain and cannot itself be modified otherwise. The database in storage 314 periodically synchronizes with the blockchain data locally stored in blockchain client 312, while the blockchain is updated and globally synchronized across the decentralized blockchain network 320 based on a given consensus algorithm. This will be explained further below.

Figure 4:
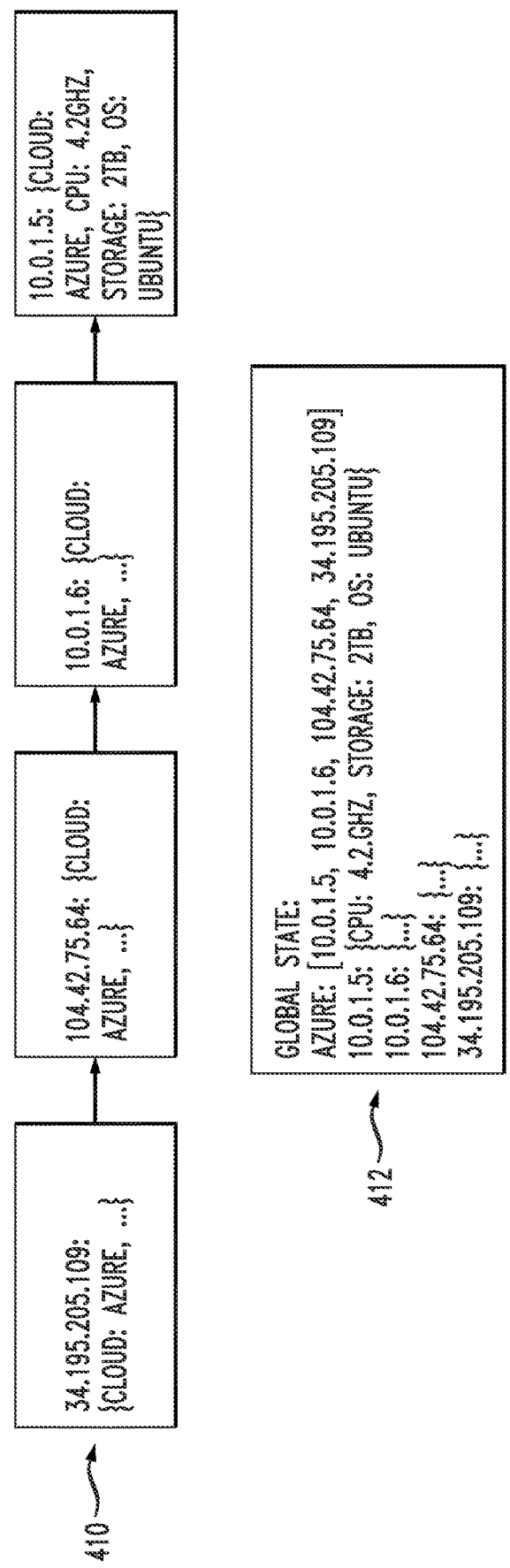
FIG. 4 illustrates an example of a blockchain and its corresponding global state according to an illustrative embodiment.

FIG. 4 shows an example 400 of node registration data 410 on the blockchain (312/320) and the corresponding global state 412 maintained by the key-value database (314). The node registration record on the blockchain is very straightforward. The record uses the Internet Protocol (IP) address of the node as the key and the description of the node (CPU, storage capacity, operating system, etc.) as the value. Note that in the illustrative embodiment shown, each record creates a new block on the blockchain, however, in alternative embodiments, a batch of records are stored on the same block. Please also note that the global state is not only a straightforward translation of the data on the blockchain, but also maintains several critical key-value pairs for better query performance. For example, in FIG. 4, the record Azure: [10.0.1.5, 10.0.1.6, 104.42.75.64, 34.195.205.109] is created in the global state so that finding an Azure node via the blockchain is very straightforward.

In summary, a node (310 in FIG. 3) locally maintains (in storage 314) information as follows:

(i) Local blockchain instance (312) synchronizes with the decentralized blockchain network (320). This process can be relatively slow, but is highly secure.

(ii) Local key-value database (314) synchronizes with the local blockchain instance (312) to build the (local) global state to facilitate the query (i.e., node finding) process.

Figure 5:
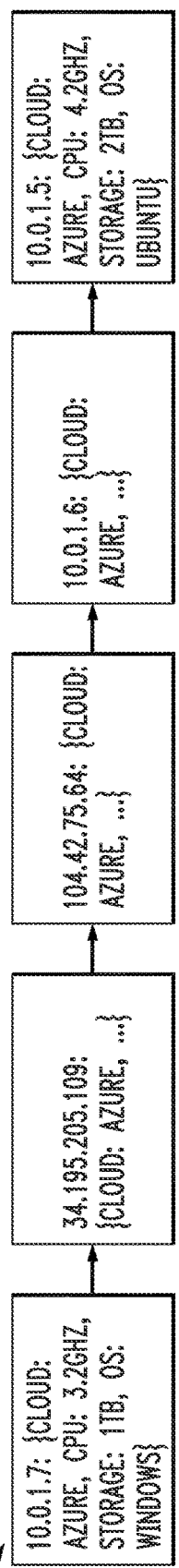
FIG. 5 illustrates a process of a new node joining a network and registering on a blockchain according to an illustrative embodiment.

A process 500 of registering a new node on the blockchain is illustrated in FIG. 5. Each node creates a description record to depict its own attributes, and sends a registration request message 510 to the blockchain network. On receiving the request, the blockchain network performs any necessary verification (e.g., grammar check of the new record, consensus validation, etc.) and creates a new record on the blockchain 512 if the record is verified. The local node database (storage 314) then synchronizes with the blockchain to update the global state 514, as explained above.

Figure 6:
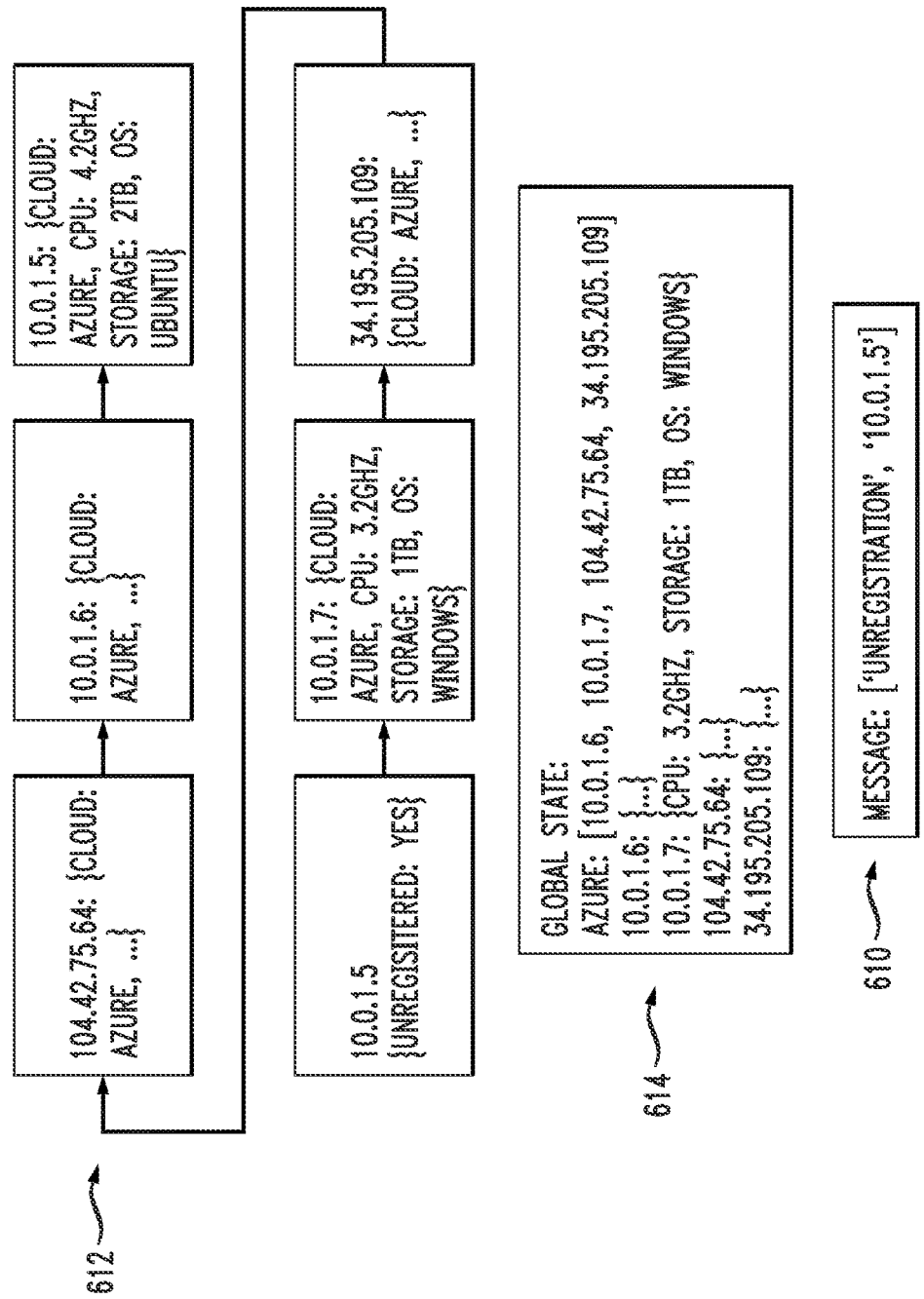
FIG. 6 illustrates a process of a new node leaving a network and unregistering from a blockchain according to an illustrative embodiment.

If a node leaves the decentralized network normally, it can unregister itself on the blockchain. As shown in process 600 in FIG. 6, the node sends an unregistration request message 610 to the blockchain network requesting to be unregistered. The blockchain validates the request and then creates a new record on the blockchain 612. It is to be noted that the record on the blockchain is also key-value based so that a new record with the IP address of the requesting node is created again, but this time the value is not the description of the node. Instead, the value states that this node is not available anymore, i.e., unregistered. Though the record on the blockchain is more complex, the global state database (storage 314) easily synchronizes with the blockchain and creates a global state 614, as shown in the figure.

It is to be further noted that the unregistration step is not necessarily required for the system to operate but it is advantageous. Any node in the system should not assume that the node registered on the blockchain is available, since the node could fail due to both software and hardware problems, which is quite common in a decentralized network. Consequently, in one or more embodiments, all nodes in the network have their own process to check the liveness of the other nodes after querying the blockchain.

Returning now to the initial problem of how a new node finds another node with specific properties in a decentralized network, such as has been illustratively described herein, illustrative embodiments address this and other problems with the introduction of a blockchain and auto synchronization of a global state database, as described above. More particularly, as will be further explained, the node finding process involve locally querying the global state database. It is to be understood that since the query will not change the data on blockchain, the process does not even need to contact the blockchain network and other peers in the network at all. FIG. 7 illustrates a process 700 for node finding according to an illustrative embodiment. In the figure, the global state database stores the global state 712 that is generated by locally synchronizing with the local blockchain client 714 which itself synchronizes with the decentralized blockchain network 716, as explained above. The global state 712 does not only maintain the public service provider information, but also maintains the heterogeneous computing resources available on the nodes such as, by way of example only, GPU (graphics processing unit) and FPGA (field programmable gate array). Thus, if a node wants to find a node on Azure with GPU capability, the node queries the global state (stored locally in its global state database) with the key 'Azure' and GPU'. Then, by computing the intersection of the two query results, the node obtains the result node with IP address '10.0.1.6' (see global state 712 in FIG. 7) and can then, for example, contact that node.

The blockchain-based node finder approach according to illustrative embodiments has many advantages and yields many benefits, some of which will now be described.

No Single Point of Failure.

The blockchain-based node finder method is fully decentralized and there is no master node in the system. The failure of any node does not affect the functionality of the blockchain-based node finder method.

Improved Query Performance.

The data maintenance tasks are left for the blockchain and the global state database. While querying, a given node does not need to contact other nodes at all. The given node simply queries its own local database. Moreover, in some embodiments, the local database maintains more keys (e.g., Azure, FPGA and GPU) to even further improve the query process.

Support authentication.

Authentication is supported in the blockchain-based node finder method. There are several ways to achieve authentication. In one embodiment, business logic code on the blockchain enforces that one node can only register one record (i.e., register one IP address) on the blockchain. One node cannot register several IP addresses on the blockchain. The record on the blockchain can only be unregistered by the node itself. This can be achieved by every registration request being cryptographically signed by the node's private key. The request is verified by the majority of the peers in the blockchain network, based on the consensus algorithm chosen. In another embodiment, a third-party certificate authority is used to issue a certificate with certain permissions to each node. As such, attribute-based access control is achieved on the blockchain. One example is Hyperledger Fabric.

Traceable Changes.

Any changes (including registration and unregistration) of node information is logged on the blockchain and is immutable. Thus, the data on the blockchain provides valuable information for the others peers in the network as well as for the system administrator.

Free of record maintenance. Once a record is created on the blockchain, there is no need for the node to maintain it anymore. The record on the blockchain is permanent, it will not expire and it is immutable. The node will therefore not become invisible to the network due to expiration of the registration record.

Robust to Network Partition.

As mentioned above, a DHT-based solution is not robust to network partition and there is no guarantee that the node registered on the DHT will be found once network partition occurs. In contrast, the blockchain-based solution according to illustrative embodiments is robust to network partition. If a network partition occurs after a new block (containing a new registration record) is accepted by the blockchain, the registered node can always be found as long as the node is reachable, since all nodes already locally have the record. If a network partition occurs before a new block is accepted by the blockchain, the node will not be found by the peers not in the same part of the network, since nodes cannot get the latest blocks on the blockchain. However, once different parts of network are reconnected, the nodes can be found thereafter.

Given the illustrative description of decentralized node finder techniques herein, FIG. 8 depicts a methodology for decentralized node finding in a multi-cloud computing environment, according to an illustrative embodiment.

In FIG. 8, methodology 800 comprises the following steps. In a multi-cloud computing environment comprising a plurality of cloud platforms with each cloud platform comprising one or more nodes, step 802 maintains, at a given one of the nodes in the multi-cloud computing environment, a blockchain instance in accordance with a decentralized blockchain network comprised of at least a subset of the nodes in the multi-cloud computing environment wherein each of the subset of nodes locally maintain a blockchain instance. Step 804 maintains, at the given one of the nodes, a global state database which is locally synchronized with the locally maintained blockchain instance and stores identifying information about nodes in the multi-cloud computing environment, wherein the identifying information comprises information on how to find one or more of the nodes.

At least portions of the decentralized node finder system in a multi-cloud computing environment shown in FIGS. 1-8 may be implemented using one or more processing platforms associated with one or more information processing systems. In some embodiments, a given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one. In many embodiments, logic may be executed across one or more physical or virtual processors. In certain embodiments, a virtual processor may be mapped to and executed on or across a portion of one or more virtual or physical processors. An illustrative embodiment of a processing platform will now be described in greater detail in conjunction with FIG. 9.

As is apparent from the above, one or more of the processing modules or other components of the decentralized node finder system in a multi-cloud computing environment shown in FIGS. 1-8 may each run on a computer, server, storage device or other processing platform element. A given such element may be viewed as an example of what is more generally referred to herein as a "processing device." An example of such a processing platform is processing platform 900 shown in FIG. 9.

The processing platform 900 in this embodiment comprises a plurality of processing devices, denoted 902-1, 902-2, 902-3, . . . 902-N, which communicate with one another over a network 904.

The network 904 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

As mentioned previously, some networks utilized in a given embodiment may comprise high-speed local networks in which associated processing devices communicate with one another utilizing Peripheral Component Interconnect Express (PCIe) cards of those devices, and networking protocols such as InfiniBand, Gigabit Ethernet or Fibre Channel.

The processing device 902-1 in the processing platform 900 comprises a processor 910 coupled to a memory 912.

The processor 910 may comprise a microprocessor, a microcontroller, an application-specific integrated circuit (ASIC), a field-programmable gate array (FPGA) or other type of processing circuitry, as well as portions or combinations of such circuitry elements.

The memory 912 may comprise random access memory (RAM), read-only memory (ROM) or other types of memory, in any combination. The memory 912 and other memories disclosed herein should be viewed as illustrative examples of what are more generally referred to as "processor-readable storage media" storing executable program code of one or more software programs.

Articles of manufacture comprising such processor-readable storage media are considered embodiments of the present disclosure. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 902-1 of the example embodiment of FIG. 9 is network interface circuitry 914, which is used to interface the processing device with the network 904 and other system components and may comprise conventional transceivers.

The other processing devices 902 of the processing platform 900 are assumed to be configured in a manner similar to that shown for processing device 902-1 in the figure.

Again, this particular processing platform is presented by way of example only, and other embodiments may include additional or alternative processing platforms, as well as numerous distinct processing platforms in any combination, with each such platform comprising one or more computers, servers, storage devices or other processing devices.

For example, other processing platforms used to implement embodiments of the disclosure can comprise different types of virtualization infrastructure, in place of or in addition to virtualization infrastructure comprising virtual machines. Such virtualization infrastructure illustratively includes container-based virtualization infrastructure configured to provide Docker containers or other types of Linux containers (LXCs).

The containers may be associated with respective tenants of a multi-tenant environment, although in other embodiments a given tenant can have multiple containers. The containers may be utilized to implement a variety of different types of functionality within the system. For example, containers can be used to implement respective cloud compute nodes or cloud storage nodes of a cloud computing and storage system. The compute nodes or storage nodes may be associated with respective cloud tenants of a multi-tenant environment. Containers may be used in combination with other virtualization infrastructure such as virtual machines implemented using a hypervisor.

As another example, portions of a given processing platform in some embodiments can comprise converged infrastructure such as VxRail™, VxRack™ or Vblock® converged infrastructure commercially available from VCE, the Virtual Computing Environment Company, now the Converged Platform and Solutions Division of Dell EMC. For example, portions of a system of the type disclosed herein can be implemented utilizing converged infrastructure.

It should therefore be understood that in other embodiments different arrangements of additional or alternative elements may be used. In many embodiments, at least a subset of these elements may be collectively implemented on a common processing platform, or each such element may be implemented on a separate processing platform.

Also, in other embodiments, numerous other arrangements of computers, servers, storage devices or other components are possible in the decentralized node finder system in a multi-cloud computing environment. Such components can communicate with other elements of the system over any type of network or other communication media.

As indicated previously, in some embodiments, components of the decentralized node finder system in a multi-cloud computing environment as disclosed herein can be implemented at least in part in the form of one or more software programs stored in memory and executed by a processor of a processing device. For example, at least portions of the execution environment or other system components are illustratively implemented in one or more embodiments the form of software running on a processing platform comprising one or more processing devices.

It should again be emphasized that the above-described embodiments of the disclosure are presented for purposes of illustration only. Many variations and other alternative embodiments may be used. For example, the disclosed techniques are applicable to a wide variety of other types of systems. Also, the particular configurations of system and device elements, associated processing operations and other functionality illustrated in the drawings can be varied in other embodiments. Moreover, the various assumptions made above in the course of describing the illustrative embodiments should also be viewed as exemplary rather than as requirements or limitations of the embodiments. Numerous other alternative embodiments within the scope of the appended claims will be readily apparent to those skilled in the art.

What is claimed is:

1. A method comprising:
   in a multi-cloud computing environment comprising a plurality of cloud platforms with each cloud platform comprising one or more nodes;
   maintaining at a given one of the nodes in the multi-cloud computing environment a blockchain instance in accordance with a decentralized blockchain network comprised of at least a subset of the nodes in the multi-cloud computing environment wherein each of the subset of nodes locally maintains a blockchain instance;
   maintaining at the given one of the nodes a global state database which is locally synchronized with the locally maintained blockchain instance and stores identifying information about nodes in the multi-cloud computing environment, wherein the identifying information comprises information on how to find one or more of the nodes; and
   querying, by the given one of the nodes, the global state database locally maintained at the given one of the nodes, to obtain the identifying information for at least one other node in the multi-cloud computing environment so as to find the at least one other node without communicating with the decentralized blockchain network and any other node of the one or more nodes including the at least one other node;
   wherein the identifying information stored by the global state database comprises a plurality of key-value pairs, a first set of the plurality of key-value pairs each having a first key identifying one of the plurality of cloud platforms and a first value identifying at least a first subset of the nodes in the multi-cloud computing environment hosted on that one of the plurality of cloud platforms, and at least a second set of the plurality of key-value pairs each comprising a second key identifying one or more designated types of computing resources and a second value identifying at least a second subset of the nodes in the multi-cloud computing environment at which the one or more designated types of computing resources are available;
   wherein querying the global state database includes computing an intersection of a first query of the first set of the plurality of key-value pairs and a second query of the second set of the plurality of key-value pairs to identify the at least one other node hosted on a given one of the plurality of cloud platforms that has at least a given type of computing resource available; and
   wherein the method is implemented via one or more processing devices each comprising a processor coupled to a memory.

2. The method of claim 1, wherein the identifying information further comprises information on one or more attributes of one or more of the nodes.

3. The method of claim 2, wherein the one or more attributes of each of the nodes comprises computing resources available on one or more of the nodes.

4. The method of claim 1, further comprising the given one of the nodes registering with the decentralized blockchain network.

5. The method of claim 4, wherein the step of registering further comprises the given one of the nodes sending a registration request message to the decentralized blockchain network.

6. The method of claim 5, wherein the registration request message is cryptographically signed by the given one of the nodes.

7. The method of claim 4, wherein a record for the given one of the nodes is added to the decentralized blockchain network after verification by a consensus of the other nodes of the decentralized blockchain network, and wherein the record indicates identifying information about the given one of the nodes.

8. The method of claim 1, further comprising the given one of the nodes unregistering with the decentralized blockchain network.

9. The method of claim 8, wherein the step of unregistering further comprises the given one of the nodes sending an unregistration request message to the decentralized blockchain network.

10. The method of claim 9, wherein a record for the given one of the nodes is added to the decentralized blockchain network after verification by a consensus of the other nodes of the decentralized blockchain network, and wherein the record indicates that the given one of the nodes is unavailable.

11. The method of claim 1, further comprising the given one of the nodes using the identifying information for the other node, obtained during the step of querying, to communicate with the other node.

12. The method of claim 11, wherein the given one of the nodes communicates with the other node for one or more of data protection functions.

13. The method of claim 12, wherein the one or more data protection functions comprise a data protection load balancing function.

14. The method of claim 12, wherein the one or more data protection functions comprise a data protection auto-upgrade function.

15. The method of claim 1, wherein the global state database stores the identifying information about the nodes in the multi-cloud computing environment as the plurality of key-value pairs.

16. The method of claim 1, further comprising the locally maintained blockchain instance synchronizing with the decentralized blockchain network.

17. The method of claim 1, wherein the plurality of cloud platforms comprises multiple private clouds, multiple public clouds, or a combination of one or more private clouds and one or more public clouds.

18. An article of manufacture comprising a non-transitory processor-readable storage medium having stored therein program code of one or more software programs, wherein the program code when executed by at least one processing device causes said at least one processing device to perform steps:
in a multi-cloud computing environment comprising a plurality of cloud platforms with each cloud platform comprising one or more nodes;
maintaining at a given one of the nodes in the multi-cloud computing environment a blockchain instance in accordance with a decentralized blockchain network comprised of at least a subset of the nodes in the multi-cloud computing environment wherein each of the subset of nodes locally maintains a blockchain instance;
maintaining at the given one of the nodes a global state database which is locally synchronized with the locally maintained blockchain instance and stores identifying information about nodes in the multi-cloud computing environment, wherein the identifying information comprises information on how to find one or more of the nodes; and
querying, by the given one of the nodes, the global state database locally maintained at the given one of the nodes, to obtain the identifying information for at least one other node in the multi-cloud computing environment so as to find the at least one other node without communicating with the decentralized blockchain network and any other node of the one or more nodes including the at least one other node;
wherein the identifying information stored by the global state database comprises a plurality of key-value pairs, a first set of the plurality of key-value pairs each having a first key identifying one of the plurality of cloud platforms and a first value identifying at least a first subset of the nodes in the multi-cloud computing environment hosted on that one of the plurality of cloud platforms, and at least a second set of the plurality of key-value pairs each comprising a second key identifying one or more designated types of computing resources and a second value identifying at least a second subset of the nodes in the multi-cloud computing environment at which the one or more designated types of computing resources are available; and
wherein querying the global state database includes computing an intersection of a first query of the first set of the plurality of key-value pairs and a second query of the second set of the plurality of key-value pairs to identify the at least one other node hosted on a given one of the plurality of cloud platforms that has at least a given type of computing resource available.

19. A system comprising:
one or more processing devices configured to:
in a multi-cloud computing environment comprising a plurality of cloud platforms with each cloud platform comprising one or more nodes;
maintain at a given one of the nodes in the multi-cloud computing environment a blockchain instance in accordance with a decentralized blockchain network comprised of at least a subset of the nodes in the multi-cloud computing environment wherein each of the subset of nodes locally maintain a blockchain instance;
maintain at the given one of the nodes a global state database which is locally synchronized with the locally maintained blockchain instance and stores identifying information about nodes in the multi-cloud computing environment, wherein the identifying information comprises information on how to find one or more of the nodes; and
query, by the given one of the nodes, the global state database locally maintained at the given one of the nodes, to obtain the identifying information for at least one other node in the multi-cloud computing environment so as to find the at least one other node without communicating with the decentralized blockchain network and any other node of the one or more nodes including the at least one other node;
wherein the identifying information stored by the global state database comprises a plurality of key-value pairs, a first set of the plurality of key-value pairs each having a first key identifying one of the plurality of cloud platforms and a first value identifying at least a first subset of the nodes in the multi-cloud computing environment hosted on that one of the plurality of cloud platforms, and at least a second set of the plurality of key-value pairs each comprising a second key identifying one or more designated types of computing resources and a second value identifying at least a second subset of the nodes in the multi-cloud computing environment at which the one or more designated types of computing resources are available; and
wherein querying the global state database includes computing an intersection of a first query of the first set of the plurality of key-value pairs and a second query of the second set of the plurality of key-value pairs to identify the at least one other node hosted on a given one of the plurality of cloud platforms that has at least a given type of computing resource available.

20. The system of claim 19, wherein:
the identifying information further comprises information on one or more attributes of one or more of the nodes; and
the one or more attributes of each of the nodes comprises computing resources available on one or more of the nodes.

* * * * *